US010896227B2

(12) United States Patent
Sato et al.

(10) Patent No.: US 10,896,227 B2
(45) Date of Patent: Jan. 19, 2021

(54) DATA PROCESSING SYSTEM, DATA PROCESSING METHOD, AND DATA STRUCTURE

(71) Applicant: Hitachi, Ltd., Tokyo (JP)

(72) Inventors: Misa Sato, Tokyo (JP); Kohsuke Yanai, Tokyo (JP); Toshihiko Yanase, Tokyo (JP)

(73) Assignee: Hitachi, Ltd., Tokyo (JP)

(*) Notice: Subject to any disclaimer, the term of this patent is extended or adjusted under 35 U.S.C. 154(b) by 475 days.

(21) Appl. No.: 15/910,979

(22) Filed: Mar. 2, 2018

(65) Prior Publication Data

US 2018/0314766 A1    Nov. 1, 2018

(30) Foreign Application Priority Data

Apr. 27, 2017 (JP) ................................ 2017-088135

(51) Int. Cl.
*G06F 16/00* (2019.01)
*G06F 16/903* (2019.01)
(Continued)

(52) U.S. Cl.
CPC .......... *G06F 16/90344* (2019.01); *G06F 7/14* (2013.01); *G06F 16/90332* (2019.01)

(58) Field of Classification Search
CPC . G06F 16/90332; G06F 16/90344; G06F 7/14
See application file for complete search history.

(56) References Cited

U.S. PATENT DOCUMENTS 7,856,388 B1 * 12/2010 Srivastava ............. G06Q 40/00
                                                      705/36 R
8,510,259 B2 *  8/2013 Binstock ............... G06F 16/211
                                                       707/602
(Continued)

FOREIGN PATENT DOCUMENTS

JP        2007-102289 A    4/2007

OTHER PUBLICATIONS

Masaaki Ida, "XBRL Financial Database for Higher Education Institutions", IEEE, 2012 14th International Conference on Advanced Communication Technology, pp. 318-322. (Year: 2012).*

(Continued)

*Primary Examiner* — Cheryl Lewis
(74) *Attorney, Agent, or Firm* — Crowell & Moring LLP

(57) ABSTRACT

A data processing system executes data processing by accessing a database. The database has a data structure including extraction target data of natural language from a data source and a search target data that is associated with the extraction target data and that can be interpreted in the data processing, and the search target data includes first attribute information of natural language indicating attribute of the extraction target data and annotation information by associating a noun phrase of natural language indicating annotation related to the extraction target data and second attribute information of natural language indicating an attribute of the annotation, the first attribute information is information searched with a first search character string specific to the data processing when an input character string is given, and the annotation information is information searched based on the input character string to the data processing when the input character string is given.

13 Claims, 9 Drawing Sheets

(51) Int. Cl.
    *G06F 7/14*          (2006.01)
    *G06F 16/9032*     (2019.01)

(56) References Cited

U.S. PATENT DOCUMENTS

| | | | | |
|---|---|---|---|---|
| 2003/0217069 | A1* | 11/2003 | Fagin | G06F 16/258 |
| 2006/0041492 | A1* | 2/2006 | Takahashi | G06Q 40/00 |
| | | | | 705/35 |
| 2006/0242181 | A1* | 10/2006 | Mueller-Klingspor | |
| | | | | G06F 16/86 |
| 2007/0078834 | A1 | 4/2007 | Nomiyama et al. | |
| 2008/0077564 | A1* | 3/2008 | Hattori | G06F 16/832 |
| 2008/0201157 | A1* | 8/2008 | McNamar | G06Q 10/10 |
| | | | | 705/1.1 |

OTHER PUBLICATIONS

Min Huang, Ding Wang, and Ke Wang, "Ontology-Based Semantic Retrieval of XBRL Data", 2011 International Conference on Business Computing and Global Informatization, pp. 363-366. (Year: 2011).*

Wenli Wang, Min Huang, and Zhen Wang, "A Storage and Query Mechanism of XBRL Data Based on Native XML Database", IEEE 2011, 2011 International Conference on Business Computing and Global Informatization, pp. 497-500. (Year: 2011).*

\* cited by examiner

FIG. 1

| ID | EXTRACTION TARGET DATA | SEARCH TARGET DATA | | | DATA SOURCE |
|---|---|---|---|---|---|
| 1 | 10 TRILLION 34.3 BILLION YEN | SALES<br>A-SEISAKUSHO@COMPANY<br>2016@YEAR<br>IFRS@ACCOUNTING STANDARD | | | IN THE CONSOLIDATED SETTLEMENT OF ACCOUNTS ANNOUNCED BY A-SEISAKUSHO YESTERDAY FOR THE FISCAL YEAR ENDING MARCH 31, 2016, THE SALES AMOUNT WAS 10 TRILLION 34.3 BILLION YEN, AND THE SALES EXCEEDED 10 TRILLION YEN FOR THE FIRST TIME IN 7 YEAR. |
| 2 | 9774930000000 | REVENUE<br>A-SEISAKUSHO@COMPANY<br>IFRS@ACCOUNTING STANDARD<br>2015@YEAR | | | <jpcrp_cor:Revenue|IFRSSummaryOfBusinessResults context Ref="CurrentYearDuration" unitRef="JPY" decimals="-6"><br>9774930000000<br></jpcrp_cor:Revenue|IFRSSummaryOfBusinessResults> |
| 3 | 9,464,801 MILLION YEN | SALES<br>KABUSHIKI GAISHA A-SEISAKUSHO@COMPANY<br>2016@YEAR<br>IFRS@ACCOUNTING STANDARD | | | 9,464,801 MILLION YEN |
| 4 | JAPAN'S LARGEST GENERAL ELECTRIC MACHINERY MANUFACTURER | OVERVIEW<br>A-SEISAKUSHO@COMPANY<br>2016@YEAR<br>IFRS@ACCOUNTING STANDARD | | | JAPAN'S LARGEST COMPREHENSIVE ELECTRIC MACHINERY MANUFACTURER. ONE OF THE MAJOR ELECTRIC COMPANIES (A-SEISAKUSHO, B, C, D, E, F, G, H). HEAVY DUTY 9 COMPANIES... |
| ... | ... | ... | | | ... |

DATA PROCESSING SYSTEM, DATA PROCESSING METHOD, AND DATA STRUCTURE

CLAIM OF PRIORITY

The present application claims priority from Japanese patent application JP 2017-88135 filed on Apr. 27, 2017, the content of which is hereby incorporated by reference into this application.

BACKGROUND OF THE INVENTION

The present invention relates to a data processing system, a data processing method, and a data structure for processing data.

Currently, it has been an issue to improve the productivity of intellectual labor, and it is required to handle various data sources without troublesome procedures. In addition, due to the tendency of the digitization of documents and open data, data is released from many data sources. Each data source has its own schema defined. A schema is a data structure in which vocabulary and the like are defined. Mechanical reading and saving of data is executed accurately from the data source in which the schema is defined.

JP 2007-102289 A discloses an information processing apparatus that accurately searches text information strongly related to numerical information such as time series data and displays it in association with the numerical information. The information processing apparatus of JP 2007-102289 A has a database apparatus. The data structure of the database apparatus is composed of text information and numerical information.

SUMMARY OF THE INVENTION

However, formulation of a schema requires human cost, economic cost, and time cost. Similarly, when updating data, it is necessary to update the schema and past data. In addition, when different schemas are defined data sources, it is difficult to match between schemas. More specifically, when the schema is different, the meaning differs for each data, and as a result, when merging multiple pieces data with different schemata (for example, join or union in Structured Query Language (SQL)) or issuing a search query for accessing the data store, association between schemata (schema matching) becomes essential, which is the cause of the above cost increase. In addition, in update of schema accompanied by update of data, it is necessary to update a plurality of logics for accessing the data store and executing data analysis, which is an increase in the above cost.

This will be explained with more specific examples. Suppose that, for any given company, a logic to analyze trends by gathering sales data for the past 10 years is implemented. As the data source, the securities report written in eXtensible Business Reporting Language (XBRL) format is used. XBRL is a standardized eXtensible Markup Language (XML) based language for financial information.

For example, if only five years of sales are available from the XBRL format securities report, it may be possible to supplement sales data from another data source. As another data source, for example, it is possible to use databases sold for commercial use, numerical data extracted from news articles, and the like. Depending on the agent, it may be a numerical data/text data maintained in a knowledge base such as DBpedia. In either case, the schema is different from the XBRL format securities report and another data source.

In this case, one logic will be executed across multiple data sources. When multiple data sources are combined, there are union (union in SQL) and join (join in SQL). In the case where one logic is implemented across multiple data sources, or in the case where the same data source is used across multiple logic, the problem arises in the identity of sales, handling of incomplete data, and costs associated with the schema.

Regarding the identity of sales, the following problem is cited when, for example, performing union of the sales for five years in securities report of XBRL format and the sales for another several years of commercial database.

(1) It is considered that the two really represent the same meaning, and union can be performed.

(2) Is that union a processing unique to the logic, or can union universally performed?

(3) Even with the same data source, XBRL has over 7 types of tags that can be interpreted as sales, which strictly have different meanings, but can they be treated as having the same meaning. (for example, the sales of Japanese accounting standards and the sales of international accounting standards may differ by several times depending on the industry, but if the accounting standards change within 10 years, can they be compared?)

(4) When two companies to be subjected to benchmark have different accounting standards, can they be compared (depending on the logic, are there those in which accounting standards can be disregarded, and those in which accounting standards can be distinguished)?

Regarding the handling of incomplete data, if accounting standards are not stated in the newspaper used as the data source or in the commercial database, a method for safely performing union by joining the accounting standards examined with another data source and setting them as sales data with accounting standards. In this case, the following problems can be mentioned.

(5) Unless which accounting standard is available within the range of available data is known, would it be better not to use the data? Ultimately, would it be better to use only complete data in which everything is complete? Alternatively, it is more beneficial to supplement and use incomplete data with estimation or completion somehow without discarding the incomplete data.

With regard to the cost related to the schema, when multiple data sources are used, it is necessary to understand the meaning of all its XML tags and data fields and understand the correspondence (which tag and which field have the same meaning or can have the same meaning). In this case, the following problems can be mentioned.

(6) A great cost is required to keep these completely managed by each logic, and therefore, if a complicated system is maintained, there is a possibility of failure. In general, when using common data with multiple logics, it is difficult to determine a generic definition used in multiple use cases. Regarding XBRL, more than 2,000 XML tags are defined, but they are updated every year, so even with a limited area, much cost is required to determine and update the schema.

On the system side that uses the schema, is it possible to maintain the system without failure without circumstances where a cost is required for defining schema meaning and association? Is it impossible to define, update, giving meaning, and associating generically usable schemas, taxonomies, general purpose knowledge representations, what it means, and the like in the first place.

In the above example, sales data is taken as an example, but it applies to many data regardless of the number or the text.

It is an object of the present invention to achieve data processing with a data structure that does not require schema definition.

A data processing system which is an aspect of the invention disclosed in the present application is a data processing system executing data processing by accessing a database and including a processor for executing a program and a storage device for storing the program, wherein the database has a data structure including extraction target data of natural language from a data source and a search target data that is associated with the extraction target data and that can be interpreted in the data processing, the search target data includes first attribute information which is a character string of natural language indicating attribute of the extraction target data and annotation information obtained by associating a noun phrase of natural language indicating annotation related to the extraction target data and second attribute information which is a character string of natural language indicating an attribute of the annotation, the first attribute information is information searched with a first search character string specific to the data processing when an input character string is given, and the annotation information is information searched based on the input character string the data processing when the input character string is given.

According to a representative embodiment of the present invention, data processing with a data structure that does not require schema definition can be achieved. The problems, constructions, and effects other than those mentioned above will be clearly understood by the description of the following embodiments.

BRIEF DESCRIPTION OF THE DRAWINGS

FIG. 1 is an explanatory view showing an example of storage contents of the data store;

DESCRIPTION OF THE PREFERRED EMBODIMENTS

<Storage Content Example of Data Store>

Figure 2:
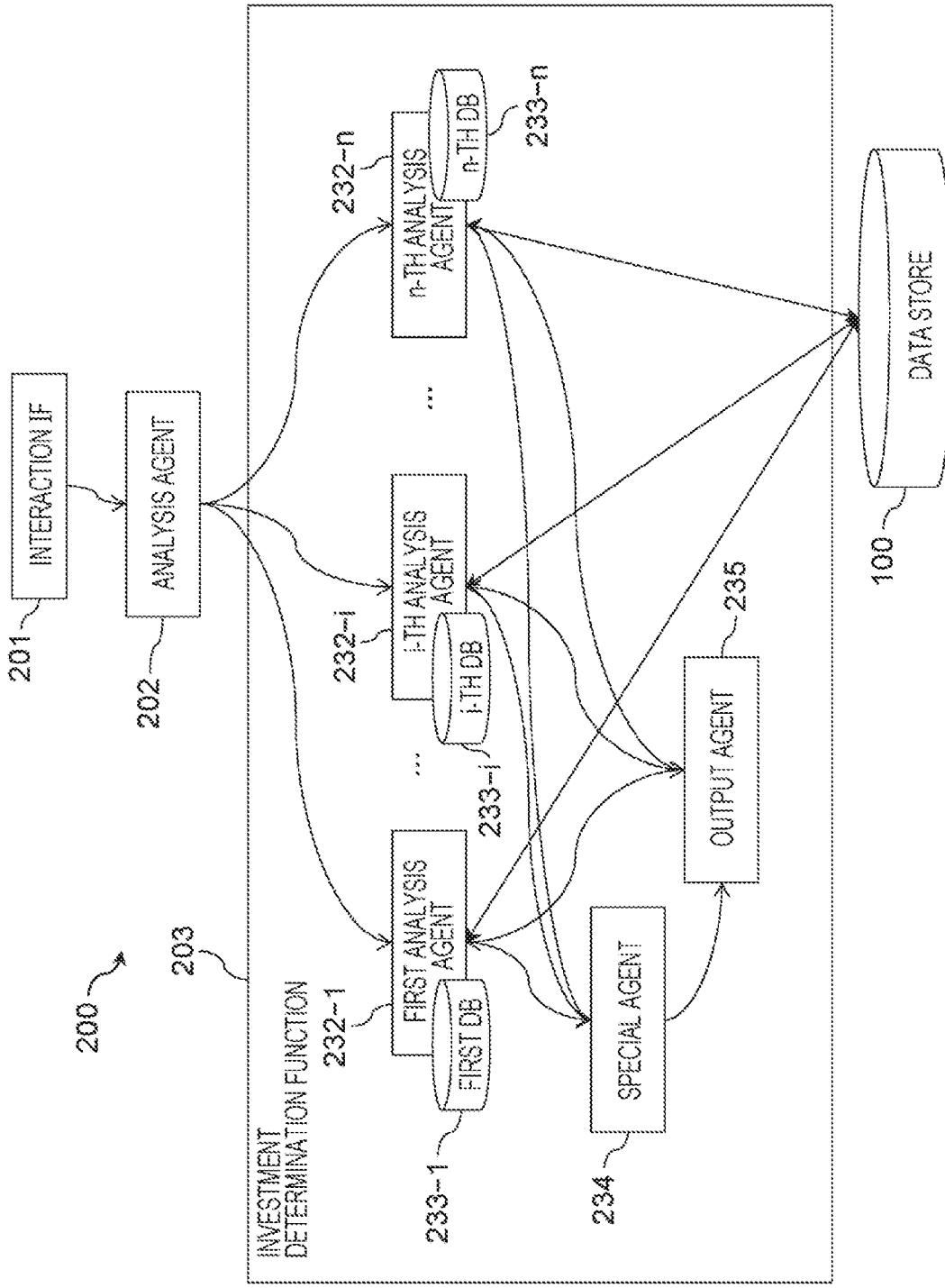
FIG. 2 is an explanatory diagram showing an example of an architecture of a data processing system.

FIG. 1 is an explanatory diagram showing storage content example of a data store. A data store 100 is a database that stores data in a data source defined by a schema or data written in natural language in a schema-independent format. In the following description of database or table, the value of AA field bbb (AA is a field name, bbb is a reference symbol) may be expressed as AAbbb. For example, the value of ID field 101 is referred to as ID101.

The data store 100 includes an ID field 101, an extraction target data field 102, a search target data field 103, and a data source field 104. An entry is constructed by the value of each field 101 to 104 in the same row.

The ID field 101 is a storage area for storing an ID. The ID 101 is identification information for uniquely identifying an entry. The extraction target data field 102 is a storage area for storing extraction target data. The extraction target data 102 is a character string (including numerical values) of a natural language selected in advance from the data source, and is data extracted by search.

The search target data field 103 is a storage area for storing search target data. The search target data 103 is data searched by a query. More specifically, for example, the search target data 103 is data independent of the data format (including the schema) of the data source such as text, XML, and table data, and includes first attribute information 131 and annotation information 132.

The first attribute information 131 is a natural language character string indicating the attribute of the extraction target data 102, such as "sales" or "revenue".

The annotation information 132 is information indicating the annotation of the extraction target data 102. More specifically, for example, the annotation information 132 is information that can be interpreted by associating, with data processing, a noun phrase 133 of a natural language indicating an annotation related to the extraction target data 102 and second attribute information 134 which is a character string of a natural language indicating the attribute of the annotation.

The noun phrase 133 is a character string ending with noun. The presence or absence of the modifier of the noun does not matter. For example, character strings such as "manufacturing facility A", "metal A which is subsidiary, "manufacturing factory A which provided funding" correspond to the noun phrase 133 here. The Second attribute information 134 is a character string of natural language indicating the attribute of annotation which is noun phrase 133, such as "company", "year", "accounting standards".

The annotation information 132 associates the noun phrase 133 with the second attribute information 134. Using a symbol @ to associate two, the annotation information 132 can be associated with noun phrase 133 ("manufacturing factory A") and the second attribute information 134 ("company") to be made into, for example, "manufacturing factory A@company".

The annotation information 132 can be interpreted by data processing. The data processing is the logic (program) executed by an agent. The agent is a processor that executes logic. The type of agent will be described later. An agent capable of interpreting the annotation information 132 is an analysis agent to be described later.

The data source field 104 is a storage area for storing a data source. The data source 104 is an information source including the extraction target data 102. Each data source 104 is composed of a data format (including a schema) which is the same as or different from the other data source 104.

For example, a data source 104 with an ID "1" is a news article, a data source 104 with an ID "2" is XBRL format specification (securities report), and a data source 104 with an ID "3" is table data of a commercial database, and a data source 104 with an ID "4" is an entry related to company information of DBpedia. The data source 104 field 104 may store a pointer to the data source 104 rather than storing the data source 104.

<Architecture of Data Processing System>

FIG. 2 is an explanatory diagram showing an example of an architecture of a data processing system. A data processing system 200 has an interaction interface (interaction IF) 201, an analysis agent 202, an investment determination function 203, and a data store 100. Incidentally, the investment determination function 203 is an example of a specific logic executed by the agent, and may be another function. The data processing system 200 may have not only the investment determination function 203 but also other functions.

The interaction IF 201 is, for example, an interface that accepts a character string or voice such as "investment in manufacturing factory A" as an input query. When voice is accepted, the interaction IF 201 converts it into character string.

The analysis agent 202 performs syntax analysis on a character string acquired by the interaction IF 201. More specifically, for example, the analysis agent 202 analyzes the character string as morphological analysis and dependency analysis. The analysis agent 202 outputs a syntax analysis result to the first analyzing agent to the n-th analyzing agent of the investment determination function 203.

The i-th analyzing agent (i is an integer satisfying 1≤i≤n) 232-*i* accesses the data store 100 and executes specific logic as data processing. The i-th analyzing agent 232-*i* performs data processing different from the j-th analyzing agent 232-*j* (j≠i). Since the i-th analyzing agent 232-*i* is included in the investment determination function 203, here, for example, the i-th analyzing agent 232-*i* is assumed to be a sales trend analyzing agent. A sales trend analyzing agent specifies analyzing target from an input query, and executes logic to analyze sales trend of the analyzing target as data processing.

The i-th analyzing agents 232-*i* has i-th DBs 233-*i*, respectively. For each word, the i-th DB 233-*i* stores a dictionary storing synonyms, and attributes of the word, and data necessary for data processing of the i-th analyzing agent 232-*i*. The details of the i-th analyzing agent 232-*i* are described in FIG. 5 and FIG. 10.

A special agent 234 is an agent that controls or supports the data processing of the i-th analyzing agent 232-*i*. For example, the special agent 234 is an agent that activates or deactivates the i-th analyzing agent 232-*i* and performs NG output when neither the i-th analyzing agent 232-*i* is executed. The special agent 234 has a rule table indicating activation criteria. This rule table defines a combination of the i-th analyzing agents that can be activated at the same time and a combination of the i-th analyzing agents that cannot be activated at the same time.

An output agent 235 is an agent that outputs the analyzing result output from the i-th analyzing agent 232-*i* to an output device 404 and a communication IF 405. The output agent 235 can also process analyzing results into graphs and tables.

<Configuration Example of Data Processing System 200>

Figure 3:
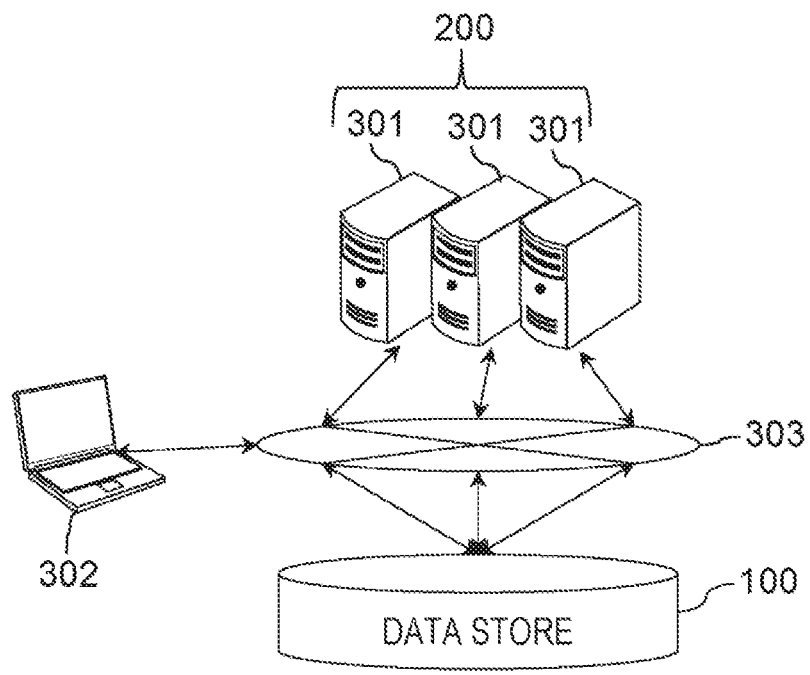
FIG. 3 is an explanatory diagram showing a configuration example of a data processing system.

FIG. 3 is an explanatory diagram showing a configuration example of the data processing system 200. The data processing system 200 is constituted by one or more computers 301. The data processing system 200 is communicatively connected to the data store 100 and a terminal 302 via a network 303 such as a Local Area Network (LAN), a Wide Area Network (WAN), the Internet, or the like. The terminal 302 transmits an input query to the interaction IF 201 of the data processing system 200 via the network. The data store 100 may be stored in the storage device in the computer 301.

<Hardware Configuration Example of Computer 301>

Figure 4:
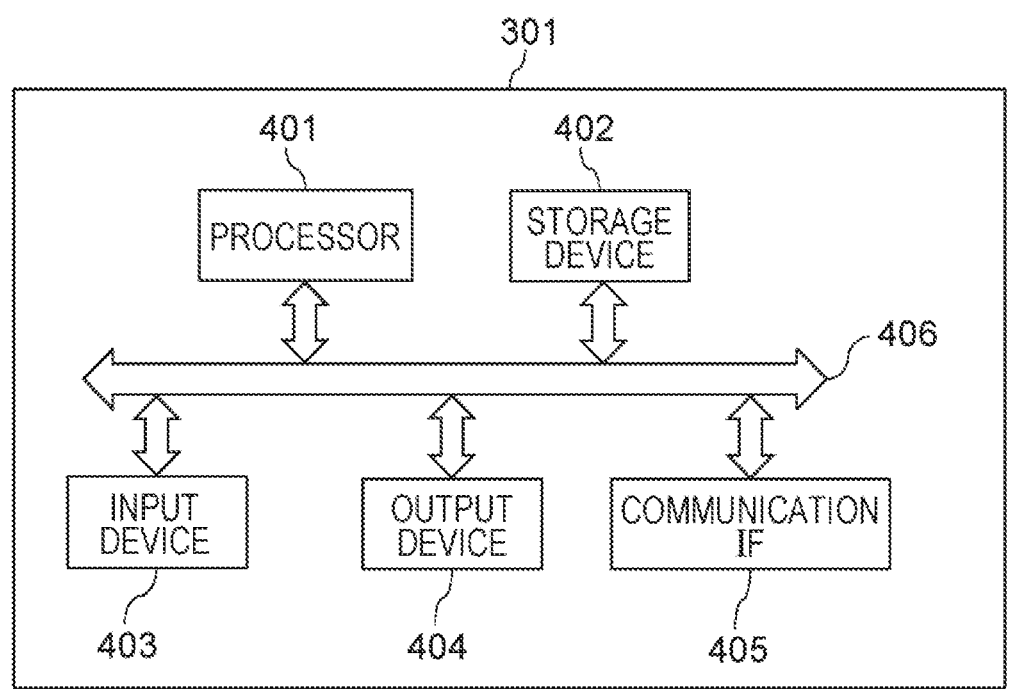
FIG. 4 is a block diagram showing an example of a hardware configuration of a computer.

FIG. 4 is a block diagram showing the hardware configuration example of the computer 301. The computer 301 includes a processor 401, a storage device 402, an input device 403, an output device 404, and a communication interface (communication IF 405). The processor 401, the storage device 402, the input device 403, the output device 404, and the communication IF 405 are connected by a bus 406. The processor 401 controls the computer 301. The storage device 402 is a working area of the processor 401. The storage device 402 is a non-transitory or temporary recording medium for storing various programs and data. Examples of the storage device 402 include a ROM (Read Only Memory), a RAM (Random Access Memory), an HDD (Hard Disk Drive), and a flash memory. The input device 403 inputs data. Examples of the input device 403 include a keyboard, a mouse, a touch panel, a numeric keypad, and a scanner. The output device 404 outputs data. Examples of the output device 404 include a display and a printer. The communication IF 405 connects with the network and transmits and receives data.

<Data Processing Example>

Figure 5:
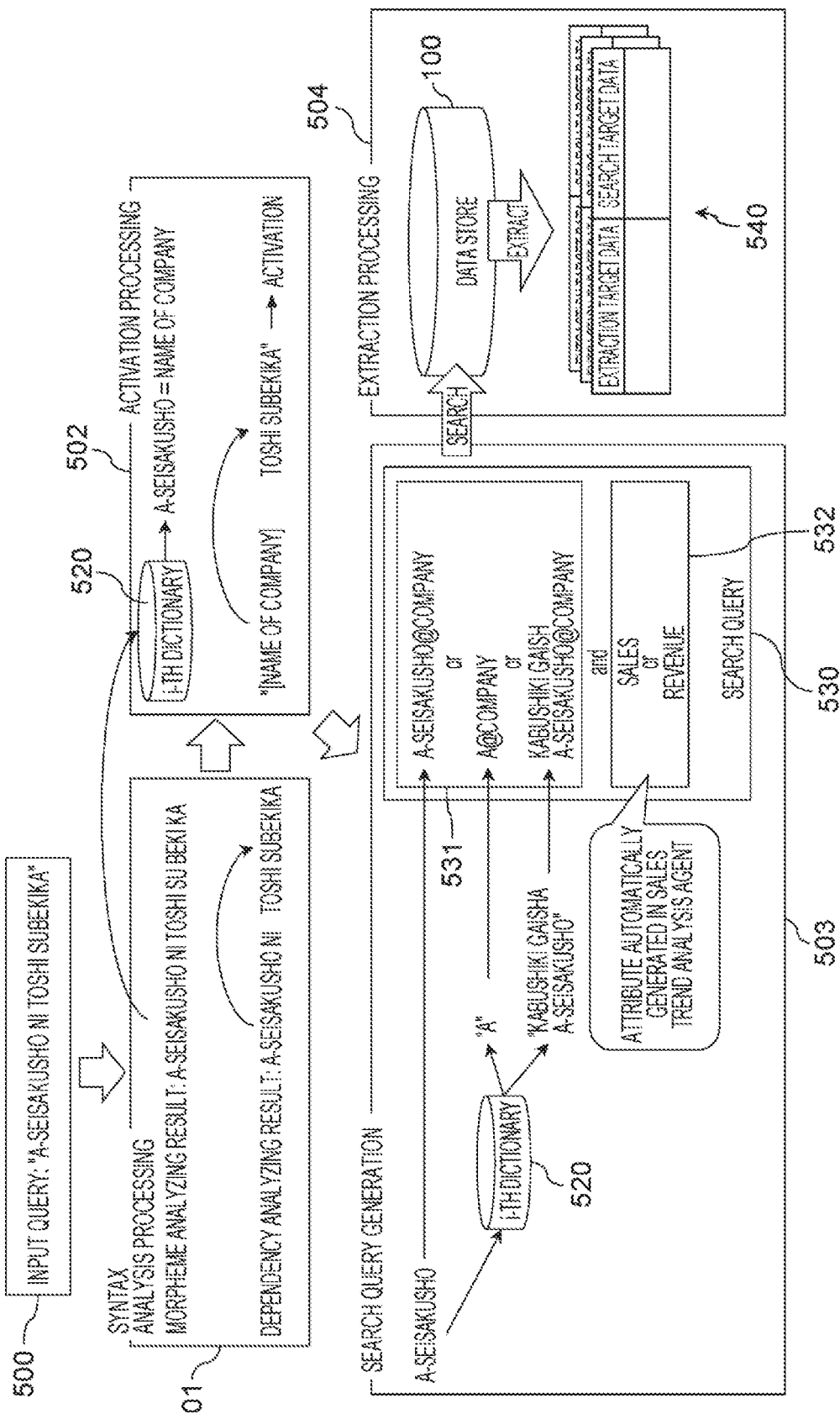
FIG. 5 is an explanatory diagram showing a first data processing A in the data processing system.
Figure 6:
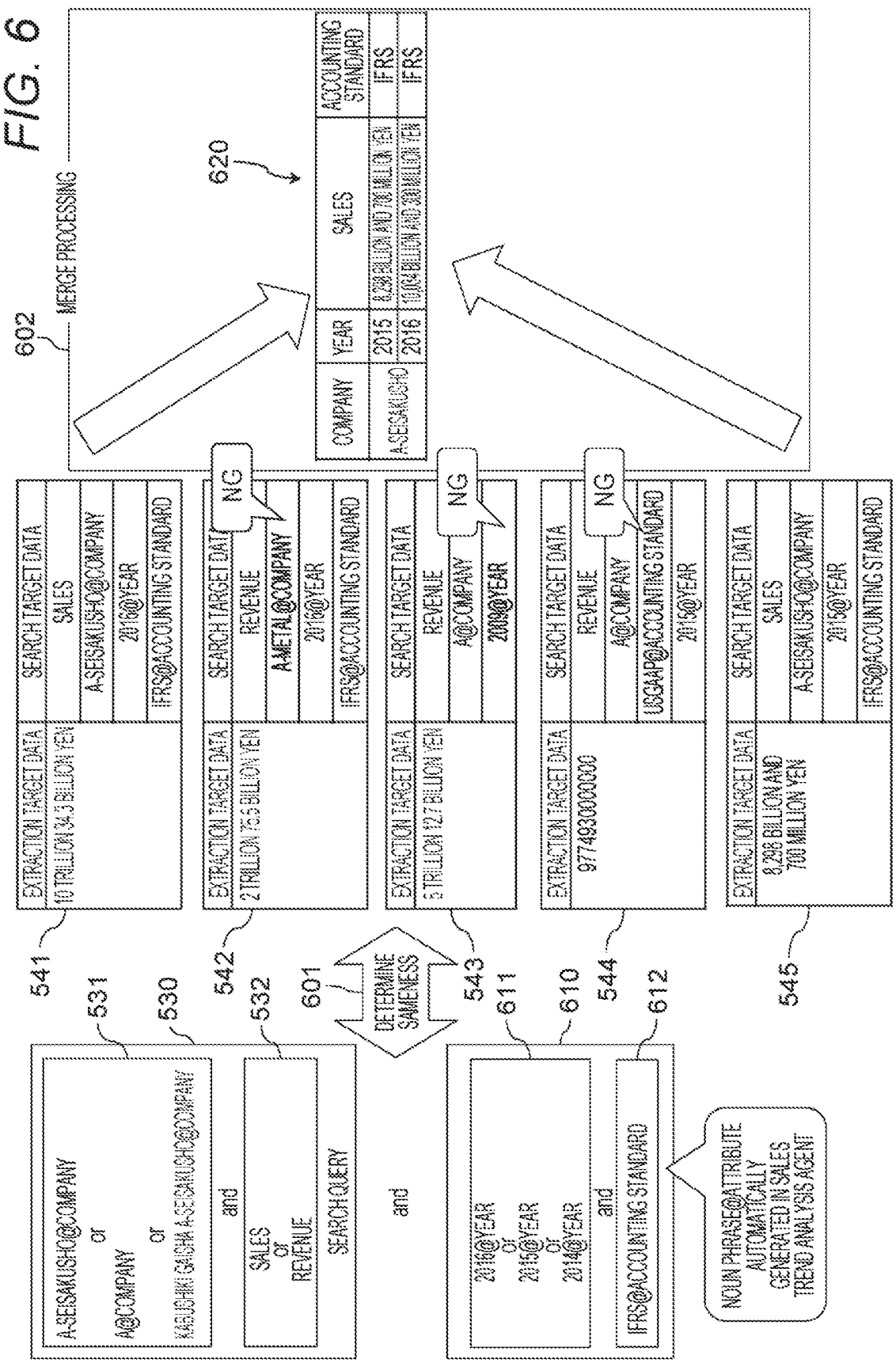
FIG. 6 is an explanatory diagram showing a second data processing A in the data processing system.

FIG. 5 is an explanatory diagram showing the first data processing A in the data processing system 200. In FIG. 5 and FIG. 6, the i-th analyzing agent 232-*i* is described as a sales trend analyzing agent. Let the input query 500 acquired by the interaction IF 201 be "A-Seisakusho ni toshi subekika".

Next, the analysis agent 202 executes a syntax analysis processing 501. In the syntax analysis processing 501, the analysis agent 202 divides "A-Seisakusho ni toshi subekika" in the input query 500 into morphemes, i.e., "A-Seisakusho", "ni", "toshi", "su", "beki", and "ka", and identifies the part of speech of each morpheme. In the syntax analysis processing 501, the analysis agent 202 divides "A-Seisakusho ni toshi subekika" in the input query 500 into segments, i.e., "A-Seisakusho ni" and "toshi subekika", and identifies that "toshi subekika" is dependent on "A-Seisakusho ni".

Next, the i-th analyzing agent 232-*i* executes the activation processing 502 as data processing. In the activation processing 502, the i-th analyzing agent 232-*i* determines whether to activate itself by using a syntax analysis result. For example, when, in the syntax analysis result, a noun "A-Seisakusho" included in the input query 500 is included in the i-th dictionary 520 in the i-th DB 233-*i* and a word "toshi" that determines whether sales trend analyzing is required or not is included in the input query 500 and the segment including the noun is dependent on the segment including word "toshi", the i-th analyzing agent 232-*i* activates itself. If not, the i-th analyzing agent 232-*i* deactivates itself.

If the i-th analyzing agent 232-*i* is changed to inactive by the special agent 234 even if the i-th analyzing agent 232-*i* is activated here, the i-th analyzing agent 232-*i* may be changed to activation by the special agent 234 even if the i-th analyzing agent 232-*i* is deactivated. It is assumed that the i-th analyzing agent 232-*i* is activated In FIG. 5.

Next, the i-th analyzing agent 232-*i* executes search query generation processing 503 as data processing. In the search query generation processing 503, the i-th analyzing agent 232-*i* converts the input query 500 into a search query 530 with which it is easy to search the search target data 103 of the data store 100. As a result, search of the search target data 103 independent of the schema can be performed.

In the search query generation processing 503, the i-th analyzing agent 232-*i* extracts nouns "A" and "Kabushiki Gaisha A-Seisakusho" or an attribute "company" which is the same as or similar to the analyzing target noun "A-Seisakusho" from the i-th dictionary 520. The i-th analyzing agent 232-*i* associates the extracted noun with the extracted attribute with symbol @, and generates a first portion search query 531 which is a union of these. The first portion search query 531 is a query for searching the annotation information 132 of the search target data 103.

The i-th analyzing agent 232-*i* extracts words "sales" and "revenue" necessary for sales trend analyzing from the i-th dictionary 520 and generates a second portion search query 532 which is a union of these items. The second portion search query 532 is a query for searching the first attribute information 131 of the search target data 103. Then, the i-th analyzing agent 232-*i* generates a search query 530 which is an intersection of the first portion search query 531 and the second portion search query 532.

Next, the i-th analyzing agent 232-*i* executes extraction processing 504 as data processing. In the extraction processing 504, the i-th analyzing agent 232-*i* accesses the data store 100 and searches the search target data 103 using the search query 530.

More specifically, for example, the i-th analyzing agent 232-*i* searches (e.g., similarity search) the first attribute information 131 using the first portion search query 531, and searches the annotation information 132 (for example, an exact match search with any word) using the second portion search query 532. In the same search target data 103, the i-th analyzing agent 232-*i* extracts the first attribute information 131, the annotation information 132, and the extraction target data 102 that match the search query 530 as an extraction result 540.

FIG. 6 is an explanatory diagram showing the second data processing A in the data processing system 200. Next, the i-th analyzing agent 232-*i* executes sameness determination processing 601 as data processing. The sameness determination processing 601 is processing for confirming whether the extraction results 540 may be merged. This makes it possible to merge the extraction results 540 without depending on the schema. In the sameness determination processing 601, the i-th analyzing agent 232-*i* generates an additional search query 610 concerning the period and method which are unknown in the input query 500.

The additional search query 610 is a query that searches under conditions not specified in the input query 500. More specifically, for example, the additional search query 610 has a third portion search query 611 having a period as a condition and a fourth portion search query 612 having a method as a condition. The i-th analyzing agent 232-*i* generates, as the third portion search query 611, union of a noun phrase (2016 and the like) indicating the year from the present (2017) to the past N years (N is a preset natural number, in this case, N=3) and the attribute thereof (year). The i-th analyzing agent 232-*i* generates a preset accounting standard name (IFRS) and the attribute thereof (accounting standard) as fourth portion search query 612 having the calculation method of extraction target data 102 as a condition.

There are two kinds of sameness determination processing 601. One is processing (hereinafter referred to as first sameness determination processing) that determines the sameness of the first portion search query 531 of the search query 530 and the annotation information 132. The other is processing to determine the sameness of the additional search query 610 and the annotation information 132 (non-search annotation information 132) which is not searched in the search of the extraction processing 504 in the extraction result 540 (hereinafter referred to as second sameness determination processing).

In the first sameness determination processing, a determination is made as to whether the sameness of the first portion search query 531 and the annotation information 132 that matches the attribute of the first portion search query 531. In the case of the extraction result 541, "A-Seisakusho@company" in the first portion search query 531 and the annotation information 132 "A-Seisakusho@company" of the extraction result 541 exactly match, and therefore, the i-th analyzing agent 232-*i* determines that both have sameness.

The extraction result 542 includes the annotation information 132 "A-metal@company" that partly matches "A@company" in the first portion search query 531. However, "A" and "A-metal" are different companies because they do not completely match. Therefore, the i-th analyzing agent 232-*i* determines that the extraction result 542 has no sameness.

Note that the attribute of the annotation information 132 may not be exactly the same, but even whey it is a synonym, it may be regarded as the same. For example, if the annotation information 132 of the extraction result 541 is "A-Seisakusho@corporation", the i-th analyzing agent 232-*i* determines that the "corporation" is synonyms with "company". Therefore, the i-th analyzing agent 232-*i* determines that "sameness" exists in "A-Seisakusho@company" in the first portion search query 531 and the annotation information 132 "A-Seisakusho@corporation" of the extraction result 541.

In second sameness determination processing, sameness of the additional search query 610 and the non-search annotation information 132 is determined. The extraction result 543 includes non-search annotation information 132 "2009@year". Since the non-search annotation information 132 "2009@year" does not match the third portion search query 611 of the additional search query 610, the i-th analyzing agent 232-*i* determines that the extraction result 543 does not have any sameness.

The extraction result 544 includes non-search annotation information 132 "USGAAP@accounting standard". Since the non-search annotation information 132 "USGAAP@accounting standard" does not match the fourth portion search query 612 of the additional search query 610, the i-th analyzing agent 232-*i* determines that the extraction result 544 has no sameness.

The extraction result 545 includes the non-search annotation information 132 "2015@year" and "IFRS@accounting standard". The non-search annotation information 132 "2015@year" matches the third portion search query 611 of the additional search query 610, and the non-search annotation information 132 "IFRS@accounting standard" matches the fourth portion search query 612 of the additional search query 610. Therefore, the i-th analyzing agent 232-*i* determines that the extraction result 545 has sameness.

It should be noted that N of the third portion search query 611 can be freely changed by the user. In the fourth portion search query 612, "IFRS" is set as the accounting standard, but it may be set to accounting standard according to the nationality of the company of the analyzing target (it is considered that the nationality is also registered in the i-th dictionary 520 in association with the company). In this case, although the period and method are described as conditions not specified in the input query 500, not only the period and method but also the analyzing target and the investment destination may be used as conditions unless specified in the input query 500.

Finally, the i-th analyzing agent **232-*i* performs, as data processing, merge processing 602 which merges the extraction results 540 determined as having sameness by the sameness determination processing 601. More specifically, the merge processing 602 is executed by, for example, SQL union (integration) or join (join). In the example of FIG. 6, the i-th analyzing agent 232-*i* merges the extraction results 541, 545 determined as having sameness and obtains a merge result 620**.

With such data processing, it is possible to realize an alternative function of the schema definition, and it is possible to realize data processing independent from schema.

Figure 9:
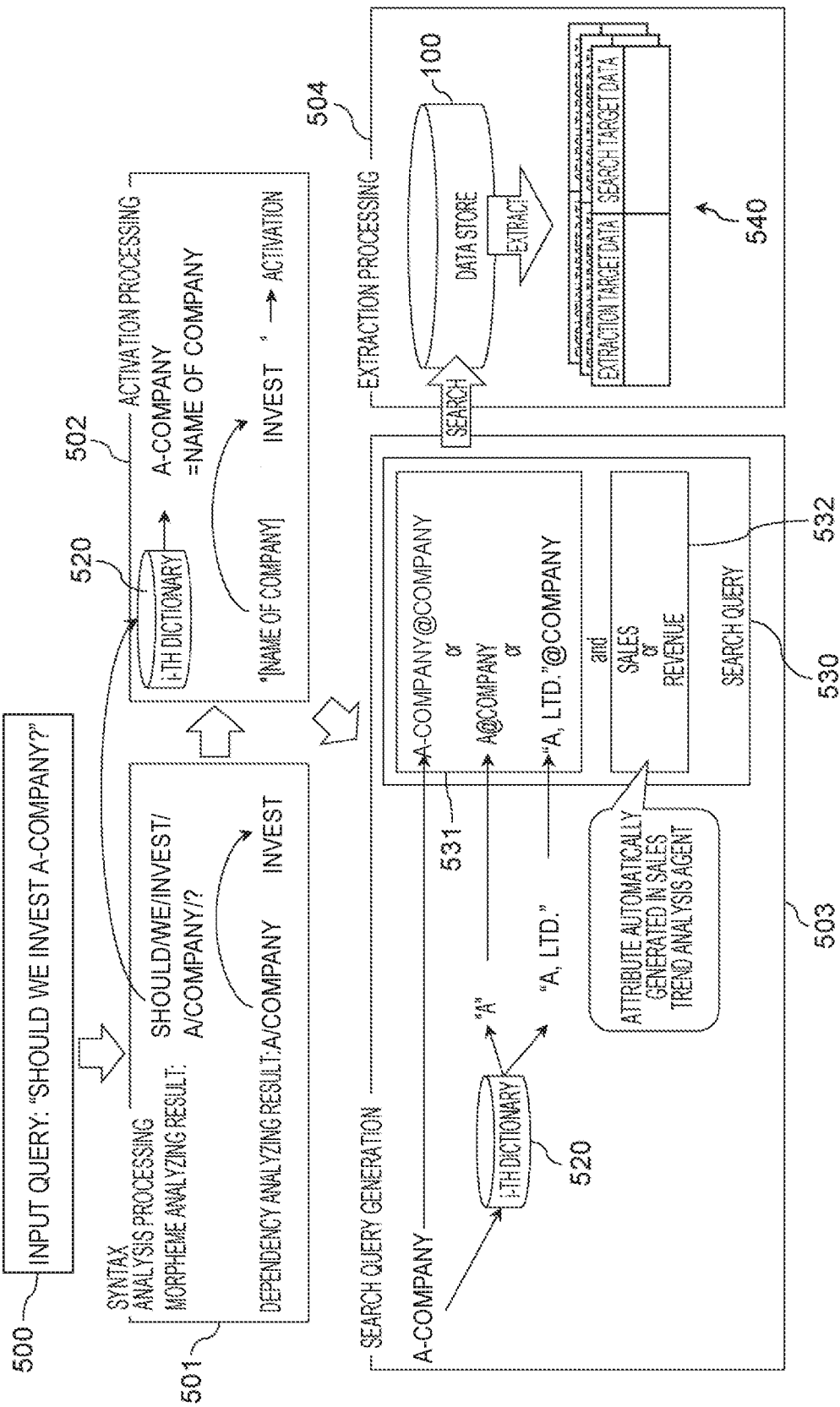
FIG. 9 is an explanatory diagram showing a first data processing B in the data processing system.
Figure 10:
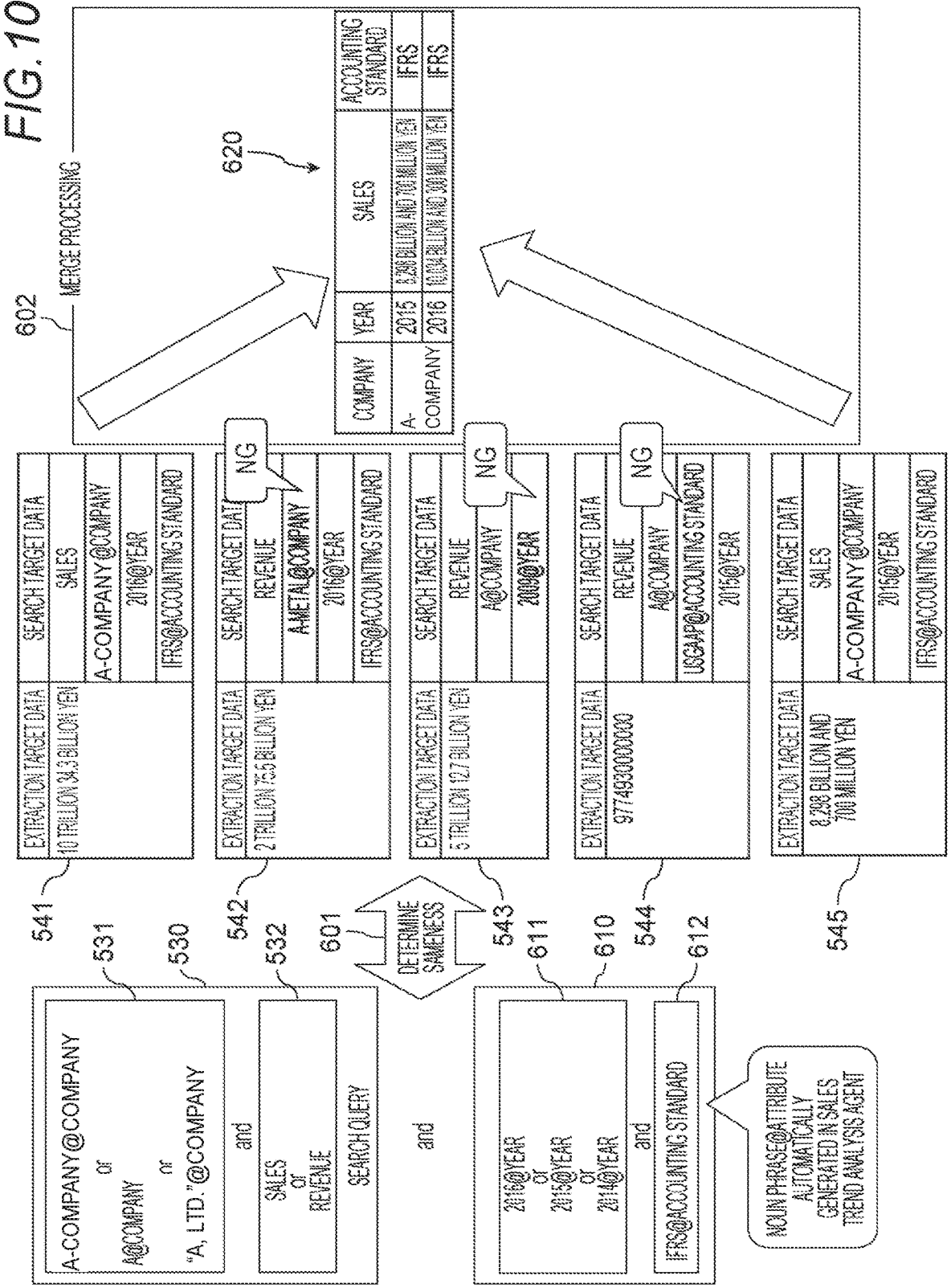
FIG. 10 is an explanatory diagram showing a second data processing B in the data processing system.

FIG. 9 is an explanatory diagram showing the data processing 1B in the data processing system 200. In FIG. 9 and FIG. 10, the i-th analyzing agent **232-*i* is described as a sales trend analyzing agent. In the explanation of FIGS. 9 and 10, differences from 5 and 6 will be described, and a common explanation between FIGS. 5 and 6 and FIGS. 9 and 10 will be omitted. Let the input query 500 acquired by the interaction IF 201** be "Should we invest A-company?".

Next, the analysis agent 202 executes a syntax analysis processing 501. In the syntax analysis processing 501, the analysis agent 202 divides "Should we invest A-company?" in the input query 500 into words, i.e., "Should", "we", "invest", "A", "company", and "?", and identifies the part of speech of each word. In the syntax analysis processing 501, the analysis agent 202 identifies that "A", and "company" are the segment corresponding to the objective case of "invest".

Next, the i-th analyzing agent **232-*i* executes the activation processing 502 as data processing. In the activation processing 502, the i-th analyzing agent 232-*i* determines whether to activate itself by using a syntax analysis result. For example, when, in the syntax analysis result, a noun "A", and "company" included in the input query 500 is included in the i-th dictionary 520 in the i-th DB 233-*i* and a word "invest" that determines whether sales trend analyzing is required or not is included in the input query 500 and the segment including the noun is dependent on the segment including word "invest", the i-th analyzing agent 232-*i* activates itself. If not, the i-th analyzing agent 232-*i*** deactivates itself.

In the search query generation processing 503, the i-th analyzing agent **232-*i* extracts nouns "A" and "A, LTD." or an attribute "company" which is the same as or similar to the analyzing target noun "A-company" from the i-th dictionary 520. The i-th analyzing agent 232-*i* associates the extracted noun with the extracted attribute with symbol @, and generates a first portion search query 531 which is a union of these. The first portion search query 531 is a query for searching the annotation information 132 of the search target data 103**.

In the first sameness determination processing, a determination is made as to whether the sameness of the first portion search query 531 and the annotation information 132 that matches the attribute of the first portion search query 531. In the case of the extraction result 541, "A-company@company" in the first portion search query 531 and the annotation information 132 "A-company@company" of the extraction result 541 exactly match, and therefore, the i-th analyzing agent **232-*i*** determines that both have sameness.

Note that the attribute of the annotation information 132 may not be exactly the same, but even whey it is a synonym, it may be regarded as the same. For example, if the annotation information 132 of the extraction result 541 is "A-company@corporation", the i-th analyzing agent **232-*i* determines that the "corporation" is synonyms with "company". Therefore, the i-th analyzing agent 232-*i* determines that "sameness" exists in "A-company@company" in the first portion search query 531 and the annotation information 132 "A-company@corporation" of the extraction result 541**.

<Data Processing Procedure Example>

Figure 7:
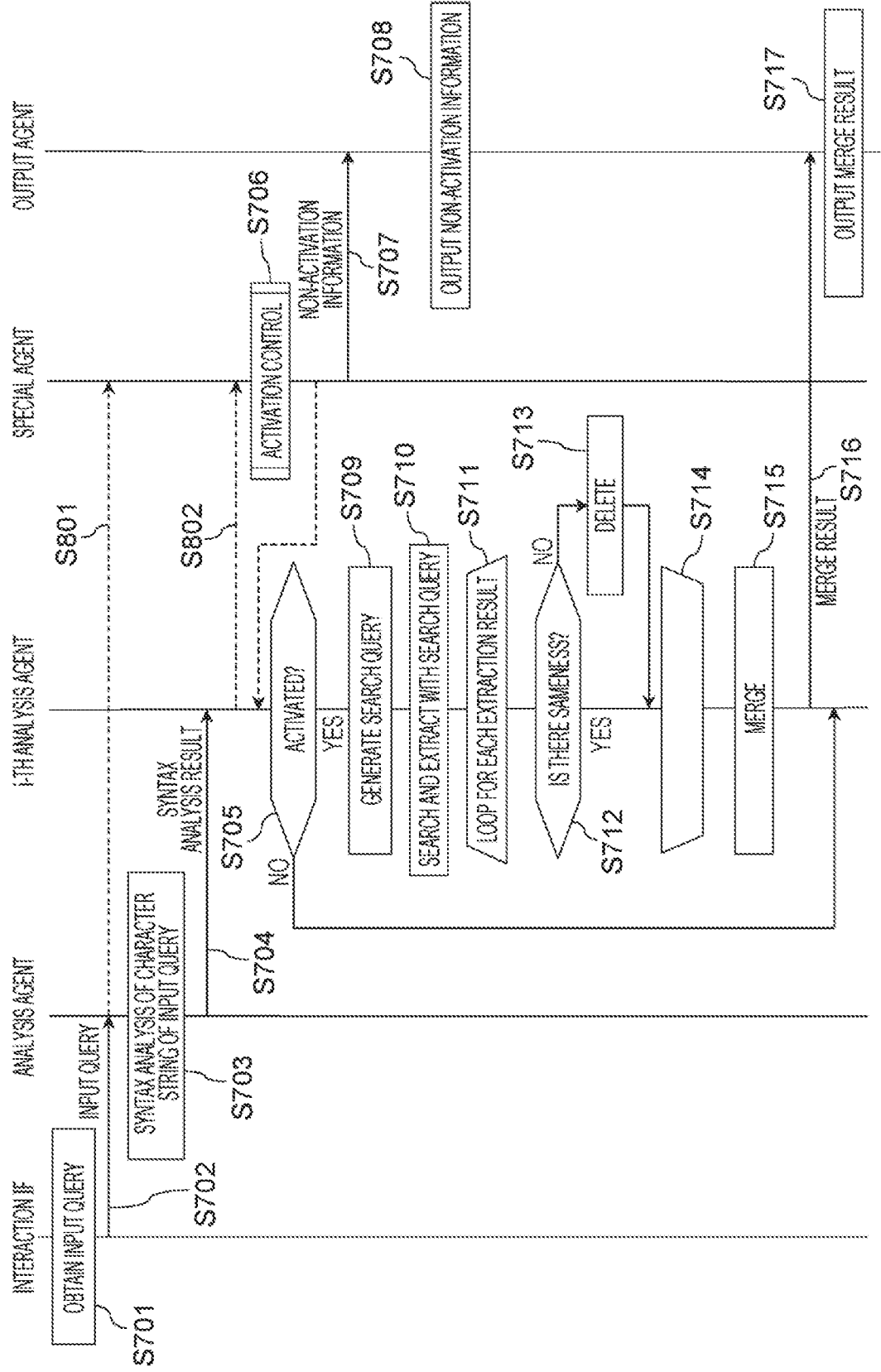
FIG. 7 is a sequence diagram showing an example of data processing procedure in the data processing system.

FIG. 7 is a sequence diagram showing the data processing procedure example in the data processing system 200. FIG. 7 shows only the i-th analyzing agent **232-*i* to represent the first analyzing agent 232-1 to the n-th analyzing agent 232-*n*. The interaction IF 201 obtains the input query 500 (step S701) and outputs the input query 500 to the analysis agent 202 (step S702). As shown in FIGS. 5 and 9, the analysis agent 202 performs syntax analysis on the character string of the input query 500 and outputs the syntax analysis result to the first analyzing agent 232-1 to the n-th analyzing agent 232-*n* (step S704**).

As shown in FIGS. 5 and 9, the i-th analyzing agent **232-*i* determines whether to activate itself by using the syntax analysis result with activation processing 502 (step S705). Prior to the determination, the special agent 234 obtains the initial decision result indicating as to whether each of the first analyzing agent 232-1 to the n-th analyzing agent 232-*n* should activate itself from the first analyzing agent 232-1 to the n-th analyzing agent 232-*n*, and executes the activation control processing (step S706**).

As a result, the special agent 234 performs control to activate the i-th analyzing agent **232-*i* which is determined not to be activated in the initial determination although it should be activated. The special agent 234 controls to activate the i-th analyzing agent 232-*i*** which is determined to be activated in the initial determination although it should not be activated.

When the special agent 234 controls all of the first analyzing agent 232-1 to the n-th analyzing agent **232-*n* into non-activation, the special agent 234 transmits non-activation information to that effect to the output agent 235 (step S707). The output agent 235 outputs non-activation information from the output device 404 to the output or from the communication IF 405 to the terminal 302 (step S708). The detail of activation control processing (step S706) will be described later with reference to FIG. 8**.

In step S705, when, upon receiving the result of the activation control processing (step S706), the i-th analyzing agent **232-*i* determines that the i-th analyzing agent 232-*i* should not activate itself (step S705: No), the i-th analyzing agent 232-*i* terminates the processing and enters a sleep state until new syntax analysis result is accepted (step S704**).

On the other hand, when, upon receiving the result of activation control processing (step S706), the i-th analyzing agent **232-*i* determines that the i-th analyzing agent 232-*i* should activate itself (step S705: Yes), the i-the analyzing agent 232-*i* generates a search query 530 in search query generation processing 503 as shown in FIGS. 5 and 9 (step S709**).

Next, as shown in FIGS. 5 and 9, the i-th analyzing agent **232-*i* searches the search target data 103 with the search query 530 by extraction processing 504 and extracts the extraction result 540 (step S710). Then, the i-th analyzing agent 232-*i* selects an extraction result 540 one by one and executes sameness determination processing 601 shown in FIGS. 6 and 10 for each extraction result 540 (step S711**).

The i-th analyzing agent 232-*i* determines the sameness between the search query 530 and the extraction result 540 (step S712). When there is no sameness (step S713: No), the i-th analyzing agent 232-*i* deletes the extraction result 540 (step S713), selects the next extraction result 540, and executes sameness determination processing 601 (step S711).

If there is sameness (step S712: Yes), the i-th analyzing agent 232-*i* deletes the extraction result 540 (step S713), selects the next extraction result 540 and executes sameness determination processing 601 (step S711). When all the extraction results 540 are selected (step S714), the i-th analyzing agent 232-*i* merges the remaining extraction result 540 by merge processing 602 as shown in FIGS. 6 and 10 (step S715), and outputs the merge result 620 to the output agent 235 (step S717). The output agent 235 outputs the merge result 620 from the output device 404 or outputs from the communication IF 405 to the terminal 302 (step S717).

<Activation Control Processing (Step S706)>

Figure 8:
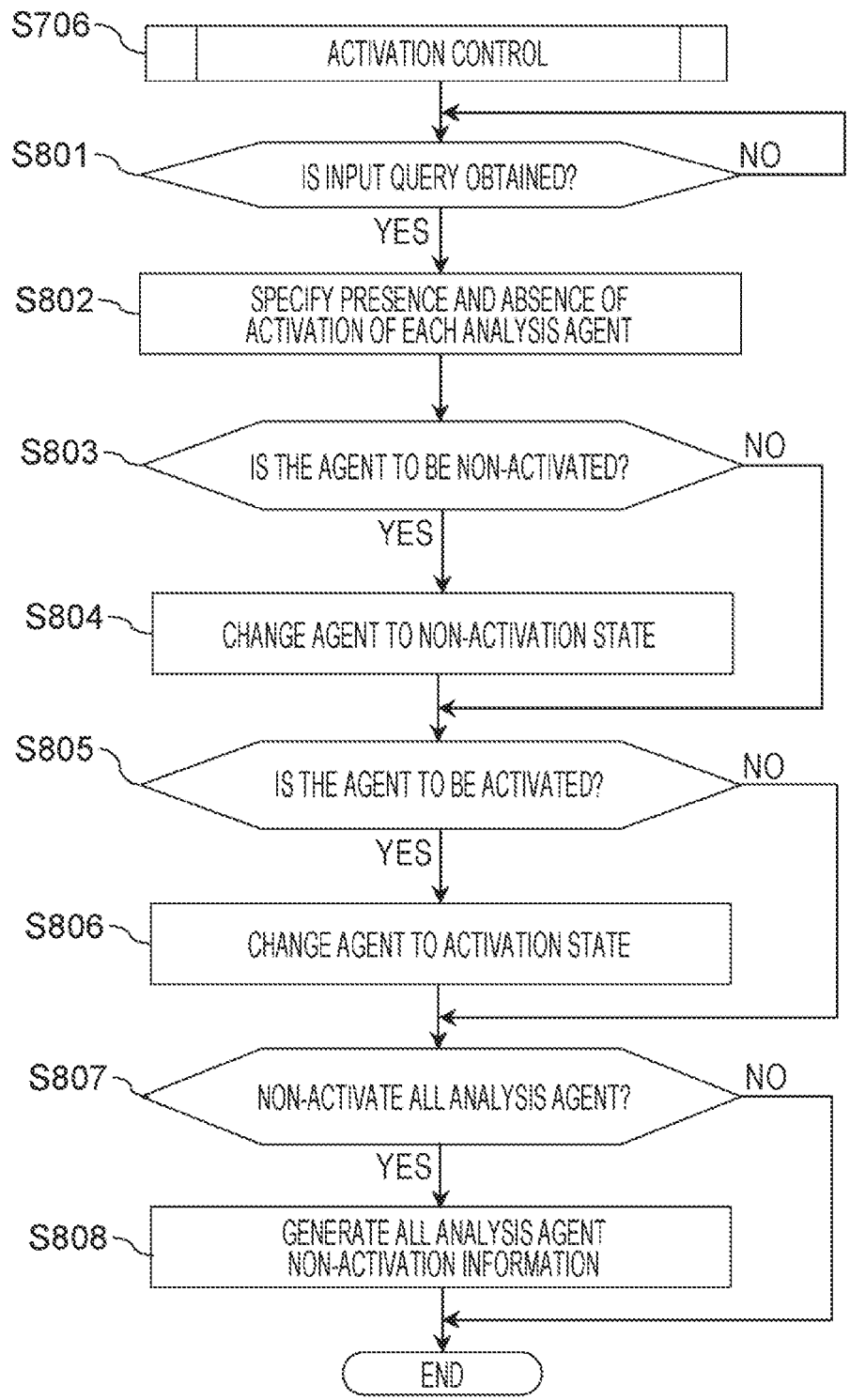
FIG. 8 is a flowchart showing an example of detailed processing procedure of activation control processing (step S706) shown in FIG. 7.

FIG. 8 is a flowchart showing the detailed processing procedure example of the activation control processing (step S706) shown in FIG. 7. The special agent 234 waits until the input query 500 is obtained in the interaction IF 201 (step S801: No). When the input query 500 is acquired (step S801: Yes), the presence or absence of activation in the initial determination of the i-th analyzing agent 232-*i* is specified from the i-th analyzing agent 232-*i* (step S802).

The special agent 234 determines whether there is an agent to be non-activated among the i-th analyzing agent 232-*i* determined to be activated by the initial determination (step S803). If there is an agent to be non-activated (step S803: Yes), the agent is instructed to change to non-activation state (step S804), and the process proceeds to step S805. On the other hand, if there is no agent to be set as non-activation state (step S804: No), the process proceeds to step S805.

The special agent 234 determines whether there is an agent to be activated among the i-th analyzing agent 232-*i* determined to be non-activated by the initial determination (step S805). If there is an agent to be activated (step S805: Yes), the agent is instructed to change to activation state (step S806), and the process proceeds to step S807. On the other hand, if there is no agent to be activated (step S805: No), the process proceeds to step S807.

The special agent 234 determines whether the whole analyzing agents are in non-activation state (step S807). When the whole analyzing agents are in non-activation state (step S807: Yes), the special agent 234 generates non-activation information indicating that the whole analyzing agents are in non-activation state (step S808). As a result, the special agent 234 outputs non-activation information to the output agent 235 (step S707). On the other hand, when the all the analyzing agents are not in non-activation state (step S807: No), the special agent 234 terminates the processing and enters a sleep state until the input query 500 is acquired in the interaction IF 201, and does not output the non-activation information.

Thus, the data processing system 200 according to the present embodiment accesses the database and executes data processing (e.g., the i-th analyzing agent 232-*i*). The database is a data structure including the extraction target data 102 of natural language from the data source 104 and the search target data 103 that can be interpreted in the data processing and that is associated with extraction target data 102.

The search target data 103 includes first attribute information 131 which is a character string of natural language indicating the attribute of the extraction target data 102 and the annotation information 132 associating the noun phrase 133 of the natural language indicating the annotation related to the extraction target data 102 and the second attribute information 134 which is a character string of the natural language indicating the attribute of the annotation. The first attribute information 131 is information that is searched with the first search character string (e.g., sales) specific to the data processing when an input character string is given. The annotation information 132 is information that is searched based on an input character string in data processing when an input character string (e.g., "investment should be made in A-Seisakusho") is given.

This realizes data processing with a versatile data structure which does not require schema definition. More specifically, for example, data processing becomes searchable using the annotation information 132, and schema definition becomes unnecessary. Therefore, the cost reduction is realized. In addition, unlike the schema definition, the annotation information 132 is a natural language, and therefore, when the data source 104 is updated, updating the annotation information 132 itself is unnecessary.

When the data processing system 200 executes a plurality of kinds of data processing (the first analyzing agent 232-1 to the n-th analyzing agent 232-*n*) and is given with an input character string, the data processing system 200 determines whether or not to execute each of data processing, and based on the activation criteria stored in the storage device 402, the data processing system 200 executes the data processing when the data processing to be executed is not executed, and suppresses execution when the data processing which should not be executed is executed.

By this activation control processing, it is possible to execute a combination of necessary data processing in the function, and it is possible to reduce the load of the data processing system 200 by suppressing wasteful execution of data processing.

The data source 104 of an extraction target data 102 and the data source 104 of another extraction target data 102 may be defined in different data formats. As a result, it is possible to improve the degree of freedom in selecting the data source 104 as the extraction source of the extraction target data 102.

The data processing system 200 performs the extraction processing 504 to extract specific first attribute information 131 of specific search target data 103 for data processing and specific extraction target data 102 corresponding to the specific search target data 103 and output processing for outputting extraction result 540 obtained from the extraction processing 504. As a result, it is possible to realize data extraction independent from schema.

The data processing system 200 executes search query generation processing 503 which generates a search query 530 with identical or similar character string as the first search character string (for example, the second portion search query 532 including "sales" and "revenues"). In the data processing system 200, the extraction processing 504 searches the first attribute information 131 of the search target data 103 with the search query 530 to extract the specific first attribute information 131 corresponding to the search query 530 and the specific extraction target data 102 corresponding to the specific search target data 103 including the specific first attribute information 131. This makes it possible to realize a search unique to data processing without depending on the schema.

The data processing system 200 executes syntax analysis processing 501 for syntax analysis of the input character string, and in search query generation processing 503, the second search character string (A-Seisakusho) is extracted from the input character string based on the syntax analysis result with the syntax analysis processing 501, and the second search character string (A-Seisakusho@company) with the attribute in which the character string (company) indicating the attribute of the second search character string is associated with second search character string is generated, and the search query 530 including the first portion search query 531 is generated with the character string identical or similar to the first search character string and the character string identical or similar to the second search character string with the attribute (A-Seisakusho@company).

In the extraction processing 504, the data processing system 200 searches the search target data 103 with the search query 530, so that the character string identical or similar to the first search character string corresponds to the specific first attribute information 131 and the character string identical or similar to the second search character string with the attribute corresponds to the specific annotation information 132 corresponding to the specific first attribute information 131, the specific first attribute information 131 is extracted, and the specific extraction target data 102 corresponding to the specific search target data 103 including the specific first attribute information 131 is extracted.

This makes it possible to realize specific search for data processing using annotation and without depending on the schema.

In the search query generation processing 503, the data processing system 200 associates the character string identical or similar to the character string (company) indicating the attribute of the second search character string (company, corporation, organization, and the like) with each character string identical or similar to the second search character string (A-Seisakusho, A, Kabushiki Gaisha A-Seisakusho and the like), so that the second search character string with the attribute (A-Seisakusho@company, A-Seisakusho@corporation, A-Seisakusho@organization, A@company, A@corporation, A@organization, Kabushiki Gaisha A-Seisakusho@company, Kabushiki Gaisha A-Seisakusho@corporation, Kabushiki Gaisha A-Seisakusho@organization, and the like) is generated. As a result, it is possible to enlarge the search range of attribute so as to cover the schema.

Based on the standard regarding the data processing stored in the storage device 402, the data processing system 200 performs determination processing for determining sameness of the second search character string with the attribute of the extraction result 540 and the specific annotation information 132 included in the specific search target data 103.

In the output processing, the data processing system 200 outputs the extraction result 540 determined to be have sameness by the determination processing. As a result, it is possible to eliminate the extraction result 540 that does not match the search query 530 even if it is extracted by the extraction processing 504, and it is possible to improve the extraction accuracy without depending on the schema.

The data processing system 200 generates a third search character string with the attribute by associating the character search string indicating the attribute of the second search character string with the third search character string regarding the data processing, and the data processing system 200 executes the sameness determination processing 601 for determining sameness of the third search character string with the attribute and the specific annotation information 132 included in the specific search target data 103 on the basis of the standard regarding the data processing stored in the storage device 402.

In the output processing, the data processing system 200 outputs the extraction result 540 determined to have sameness by the sameness determination processing 601. This makes it possible to exclude the extraction result 540 that does not meet the conditions outside of the search query 530 even if it is extracted by the extraction processing 504, and it is possible to improve the extraction accuracy without depending on the schema.

The data processing system 200 executes merge processing 602 which merges the extraction results 540, and in the output processing, the merge result 620 based on the merge processing 602 is output. As a result, the extraction result 540 does not depend on the schema, so it is possible to facilitate merging.

As explained above, according to the data processing system of the present embodiment, occurrence of various costs such as human cost, economic cost, and temporal cost caused by schema formulation can be suppressed, and the introduction and operation of the target system can be facilitated.

It should be noted that the present invention is not limited to the above-described embodiment, but includes various modifications and equivalent configurations within the spirit of the accompanying claims. For example, the above-described embodiment has been described in detail in order to explain the present invention in an easy-to-understand manner, and the present invention is not necessarily limited to those that has all the described configurations. A part of the configuration of an embodiment may be replaced with the configuration of another embodiment. The configuration of another embodiment may be added to the configuration of any given embodiment. In addition, other configurations may be added, deleted, or replaced with respect to a part of the configuration of each embodiment.

A part of or all of each of the configuration, function, processing unit, processing means and the like described above may be realized with hardware by, for example, being designed with an integrated circuit, and may be realized with software by, for example, causing a processor to interpret and execute a program for realizing each function.

Information such as programs, tables, files, that realize each function can be stored in a storage device such as a memory, a hard disk, a solid state drive (SSD), or recording medium such as an integrated circuit (IC) card, an SD card, a digital versatile disc (DVD).

A control line and an information line indicate what is considered to be necessary for explanation, and not necessarily all control lines and information lines necessary for implementation are shown. In fact, it can be thought that almost all the configurations are connected with each other.

What is claimed is:

1. A data processing system executing data processing by accessing a database, comprising:
   a processor for executing a program and a storage device for storing the program, wherein the database has a data structure comprising:
   a data source field;
   an extraction target data field storing extraction target data of natural language from a data source specified in the data source field; and
   a search target data field storing search target data that is associated with the extraction target data and that can be interpreted in the data processing, wherein the search target data comprises:

first attribute information which is a character string of natural language indicating an attribute of the extraction target data;

annotation information obtained by associating a noun phrase of natural language indicating an annotation related to the extraction target data; and second attribute information which is a character string of natural language indicating an attribute of the annotation, wherein the first attribute information is searched with a first search character string specific to the data processing when an input character string is given, and the annotation information is searched based on the input character string to the data processing when the input character string is given.

2. The data processing system according to claim 1, wherein the processor can execute a plurality of types of data processing, in a case where the input character string is given, the processor determines whether each of the data processing can be executed or not, on the basis of activation criteria stored in the storage device, in a case where data processing to be executed is not executed, the processor executes the processing, and in a case where data processing to be executed is executed, the processor controls the processing.

3. The data processing system according to claim 1, wherein the data source of the extraction target data and a data source of another extraction target data are defined in different data formats.

4. The data processing system according to claim 1, wherein the processor executes:

extraction processing for extracting specific first attribute information of specific search target data related to the data processing and specific extraction target data corresponding to the specific search target data; and output processing for outputting an extraction result with the extraction processing.

5. The data processing system according to claim 4, wherein the processor executes generation processing generating a search query with a character string identical or similar to the first search character string; and in the extraction processing, the processor searches the first attribute information of the search target data with the search query to extract the specific first attribute information corresponding to the search query and specific extraction target data corresponding to the specific search target data including the specific first attribute information.

6. The data processing system according to claim 5, wherein the processor executes analysis processing for performing syntax analysis on the input character string, in the generation processing, the processor extracts a second search character string from the input character string on the basis of a syntax analysis result with the analysis processing, generates the second search character string with the attribute obtained by associating a character string indicating attribute of the second search character string with the second search character string, and generating the search query with a character string identical or similar to the second search character string with the attribute and a character string identical or similar to the first search character string, and in the extraction processing, the processor searches the search target data with the search query, and in a case where the character string identical or similar to the first search character string matches the specific first attribute information and the character string identical or similar to the second search character string with the attribute matches the specific annotation information corresponding to the specific first attribute information, the processor extracts the specific first attribute information, and extracts specific extraction target data corresponding to the specific search target data including the specific first attribute information.

7. The data processing system according to claim 6, wherein in the generation processing, the processor generates the second search character string with the attribute by associating a character string identical or similar to a character string indicating attribute of the second search character string with each character string identical or similar to the second search character string.

8. The data processing system according to claim 6, wherein the processor executes determination processing for determining sameness of the second search character string with the attribute of the extraction result and specific annotation information included in the specific search target data on the basis of a standard related to the data processing stored in the storage device, in the output processing, the processor outputs the extraction result determined to have sameness by the determination processing.

9. The data processing system according to claim 8, wherein the processor executes merge processing for merging the extraction result, and in the output processing, the processor outputs a merge result with the merge processing.

10. The data processing system according to claim 6, wherein the processor generates the third search character string with the attribute by associating a character string indicating attribute of the second search character string with a third search character string related to the data processing, and executing determination processing for determining sameness of the third search character string with the attribute and the specific annotation information included in the specific search target data on the basis of a standard of the data processing stored in the storage device, and in the output processing, the processor outputs the extraction result determined to have sameness by the determination processing.

11. A data processing method for a data processing system accessing a database and executing data processing, comprising:

a processor for executing a program and a storage device for storing the program, wherein the database has a data structure comprising:

a data source field;

an extraction target data field storing extraction target data of natural language from a data source specified in the data source field; and a search target data field storing search target data that is associated with the extraction target data and that can be interpreted in the data processing, wherein the search target data includes first attribute information which is a character string of natural language indicating an attribute of the extraction target data;
annotation information obtained by associating a noun phrase of natural language indicating an annotation related to the extraction target data; and
second attribute information which is a character string of natural language indicating an attribute of the annotation, wherein
the first attribute information is searched with a search character string specific to the data processing when an input character string is given, and
the annotation information is searched based on the input character string to the data processing when the input character string is given, wherein
in the data processing method, the processor executes extraction processing for extracting specific first attribute information of specific search target data related to the data processing and specific extraction target data corresponding to the specific search target data, and
output processing for outputting an extraction result with the extraction processing.

12. A non-transitory computer-readable medium comprising a data structure searched when data processing is executed, the data structure comprising:
a data source field;
an extraction target data field storing extraction target data of natural language from a data source; and
a search target data field storing a search target data that is associated with the extraction target data and that can be interpreted in the data processing, wherein the search target data comprises:
first attribute information which is a character string of natural language indicating an attribute of the extraction target data;
annotation information obtained by associating a noun phrase of natural language indicating an annotation related to the extraction target data; and
second attribute information which is a character string of natural language indicating an attribute of the annotation, wherein
the first attribute information is searched with a search character string specific to the data processing when an input character string is given, and
the annotation information is searched based on the input character string the data processing when the input character string is given.

13. The medium according to claim 12, wherein the data source of the extraction target data and a data source of another extraction target data are defined in different data formats.

* * * * *